Figure 1:
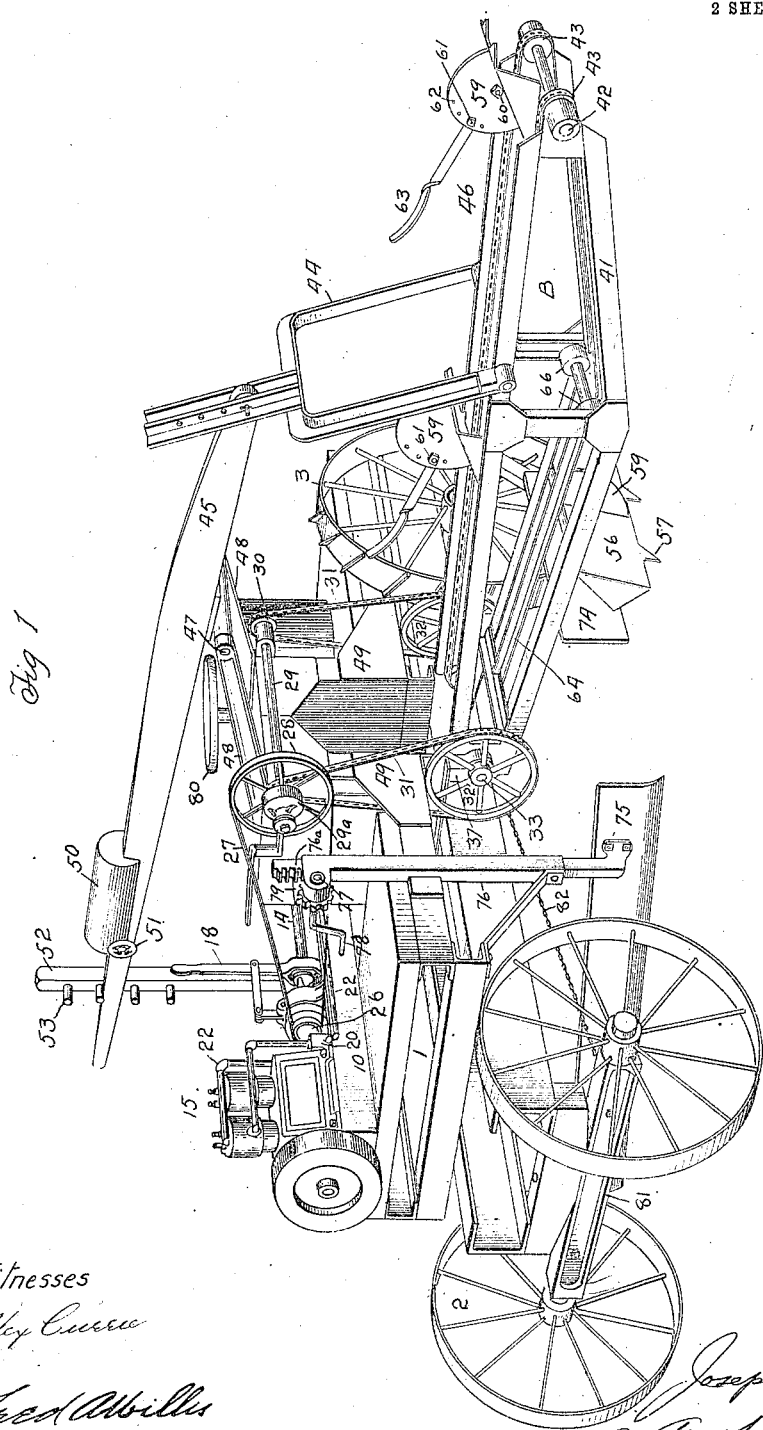

J. E. WYCKOFF.
DITCHING APPARATUS.
APPLICATION FILED MAY 24, 1910.

987,937.

Patented Mar. 28, 1911.
2 SHEETS—SHEET 1.

Witnesses

Inventor
Joseph E. Wyckoff

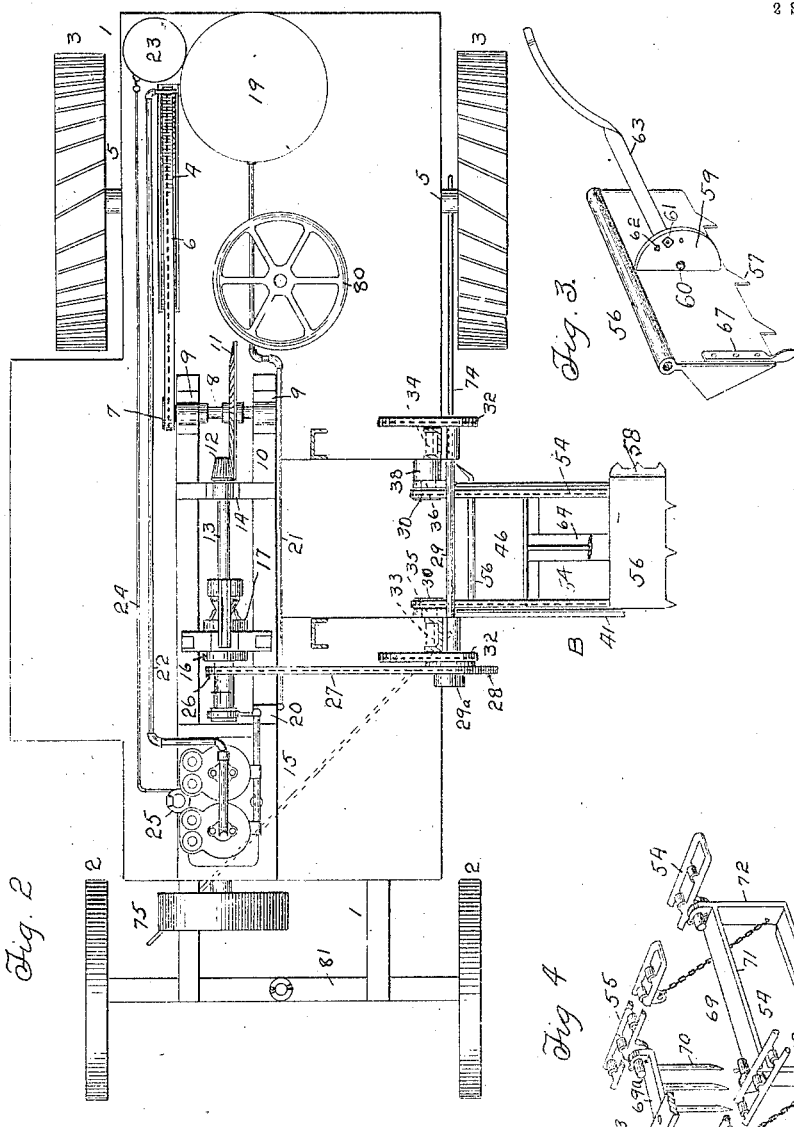

UNITED STATES PATENT OFFICE.

JOSEPH E. WYCKOFF, OF LOS ANGELES, CALIFORNIA.

DITCHING APPARATUS.

987,937.  Specification of Letters Patent.  Patented Mar. 28, 1911.

Application filed May 24, 1910. Serial No. 563,219.

*To all whom it may concern:*

Be it known that I, JOSEPH E. WYCKOFF, a citizen of the United States of America, residing at Los Angeles, in the county of Los Angeles, State of California, have invented a certain new and useful Ditching Apparatus; and I do hereby declare the following to be a full, clear, and exact description of the invention, such as will enable others skilled in the art to which it appertains to make and use the same.

This invention relates to ditching apparatus, more particularly to such as is especially adapted for use for irrigation purposes.

Objects of the invention are: to provide a simple, compact and effective ditching apparatus: which shall be self-propelling, of light weight, adapted to move either intermittently or continuously in operation, provided with instrumentalities for cutting and removing weeds, roots and the like in the line of the ditch, and provided with means to remove the earth from the edge of the ditch and with means to prevent the removed earth from returning to the ditch, in which the earth removing members are arranged to operate in a substantially vertical position and so that they may yield on encountering obstructions—means being provided for locking the members against yielding when the conditions warrant—and also arranged so that their operating angles may be changed to suit varying conditions.

With the above and other objects and advantages in view, which will be apparent to those skilled in the art, the invention consists in the novel construction, arrangement and combination of parts set forth in the following description and claims of one form of construction in which the invention may be embodied—the construction being illustrated in the accompanying drawings, in which—

Figure 1 is a perspective giving a general view of the apparatus and its mounting, the weed rake and cutter being omitted for the sake of clearness, Fig. 2 is a plan view of the apparatus, partly broken away, Fig. 3 is a detail of one of the earth removing members, with root cutting blades attached thereto, Fig. 4 is a perspective view showing the weed rake and cutter.

As shown the apparatus may be carried on main frame 1 mounted on steering wheels 2 and traction wheels 3.

Propulsion may be effected by the following driving mechanism: The sprocket wheel 4 rigidly attached to axle 5 on traction wheels 3 is connected by chain 6 with sprocket pinion 7 on countershaft 8 mounted in bearings 9 on sub-frame 10. To countershaft 8 is rigidly attached bevel gear 11 with which meshes bevel pinion 12 affixed to shaft 13 which is supported in bearing 14 attached to sub-frame 10. Shaft 13 may be driven in either direction by engine 15 through transmission gearing 16 and clutch 17, which latter is operated by handle 18; it being understood that the gearing is so designed and arranged that the mounted apparatus progresses over the ground at a relatively more rapid rate with the steering wheels leading than with the traction wheels leading. While engine 15 and transmission gearing 16 may be of any approved type, those indicated may be such as are commonly used for propulsion of small marine craft provided with gasolene engines. The cooling water may be contained in tank 19 and circulated by pump 20 through pipes 21 and 22. The gasolene supply may be from tank 23 through pipe 24 to carbureter 25 on the engine.

Hingedly connected with frame 1 and extending laterally therefrom on the side opposite to that on which the driving mechanism is mounted, is the earth removing mechanism B which may be operatively connected with the engine 15 as follows: On the engine shaft, intermediate of the engine and the transmission gearing 16, is affixed a sprocket pinion 26 connected by chain 27 to sprocket wheel 28 which may be coupled to shaft 29 by clutch 29ª. Shaft 29 carries sprocket pinions 30 which latter by means of sprocket chains 31, drive sprocket wheels 32 on shafts 33 and 34 which are arranged below the shaft 29 and which pass through sleeves 35 and 36 respectively carried by brackets 37 and 38 on frame 1.

The earth removing mechanism B preferably comprises a frame 46 made up of the spaced but cross-connected triangular side members 41 and having at its outer end a shaft 42 having affixed thereto sprocket pinions 43 over which and the sprocket pinions 39 and 40 on shafts 33 and 34 pass sprocket chains 54. The side members 41 may make a hinge connection with sleeves 35 and 36 and may be pivotally supported by a bail 44 to which may be adjustably attached an arm 45 supported on shaft 47 bearing in brackets 48 secured to the arch 49 forming a part of the frame of the apparatus. Arm 45 carries a counterbalance 50 which may be locked in adjusted position by clamping screw 51. An upright 52 may be secured to frame 1 and have thereon pins 53 with which the end of the arm 45 may engage to sustain the earth removing mechanism adjustably in position. Scrapers 56 are pivotally connected to links 55 on sprocket chains 54 and are preferably provided with teeth 57 on their lower edge in working position and also with teeth 58 at their sides. To the back of the scrapers 56 may be secured a bracket 59 to which by means of pivot bolt 60 and bolt 61 passing through one of the holes 62 in the bracket, may be adjustably attached an arm 63 adapted to contact with a guideway 64 on the lower part of the frame 46. While in contact with the guideway the arms are adapted to hold the scrapers substantially vertically whereby they remove the earth by scraping and drawing it to the point of discharge without carrying it.

It will be understood that the frame 46 may have a portion of the lower part thereof formed in such manner that when the earth removing mechanism is in working position the scrapers 56 may so act that the bottom of the ditch may be formed the lower level. The remaining portions of the frame 46 may be inclined to have the scrapers act to give the desired slope to the banks of the ditch. To prevent friction where the chains pass under the angle in the frame 46 rollers 66 are provided. One or more cutters 67 may be attached to scrapers 56 for the purpose of cutting roots, etc. The rake 68 and horizontal cutter 69 mounted on the sprocket chains 54 as shown in detail in Fig. 4 may be used in conjunction with the scrapers when the banks and bed of a ditch to be cleaned or deepened are weed-grown. The rake 68 may comprise a bar 69ª pivotally attached to links 55 and to which bar may be affixed an arm 63, similar to those previously described, and teeth 70. The cutter may comprise a bar 71 attached to links 55 of the chain 54, depending side bars 72 affixed to bar 71 and cutter bar 73 formed integral with or attached to bars 72. To prevent the removed material when it is in a semi-fluid state from flowing back into the ditch a shield 74 may be disposed near the point of discharge of scrapers 56. A scraper 75 may be adjustably attached to the frame 1 of the apparatus by means of brackets 76 wherein are racks 76ª operated by pinions on shafts 77 actuated by handles 78 and locked by pawls 79.

In operation, as will be understood from the foregoing description, the apparatus having been brought to position with the wheels upon the bank of the ditch and the engine 15 being in operation; the clutch 29ª may be engaged and frame 46 adjusted in lowered position to have the teeth 57 loosen the earth and the scrapers 56 draw it toward the apparatus to the top of the bank. As the arms 63 clear the inner end of the guideway 64 the scrapers 56 are permitted to drop back and turn face downward to discharge the earth thereon. The counterweight 50 being properly adjusted on the arm 45, should the teeth encounter stones or other hard obstructions the frame 46 rises and allows the teeth to pass over the obstruction until the earth has been removed sufficiently from around it whereupon the teeth remove it and the scrapers move it and discharge it on the top of the bank. When the scrapers have cut to a sufficient depth the frame 46 may be raised, and the apparatus progressed approximately the width of the scrapers by engaging transmission gearing 16. The frame 46 may then be again lowered and the operation repeated. Or the frame 46 may be left in its lowered position and the apparatus continuously progressed whereupon teeth 58 and the edges of the scrapers will cut the earth from in front of the advancing side of frame 46; the edges of the scrapers being constructed to project beyond the side of the frame 46 for this purpose. Bail 44 is offset to allow the edges of the scrapers to pass on their outward movement. The scraper 75 may be adjusted to remove the earth from the edge of the ditch to the desired distance therefrom. Steering may be effected through the instrumentality of steering wheel 80 to which and the ends of the axle 81 of wheels 2, is connected chain 82.

While one form of construction in which the invention may be embodied has been illustrated and described, it will occur to those skilled in the art that the particular construction admits of various changes and modifications, and the right is therefore reserved to all such changes and modifications as do not depart from the spirit and scope of the invention.

What is claimed is:

1. In ditching apparatus, in combination, a frame, mechanism hingedly connected at one end thereof with the frame, said mechanism including a frame and earth removing members mounted thereon, counterbalancing means connected with said mechanism for raising and lowering the same, means coacting with the first means to hold the mechanism in adjusted position and permitting yielding thereof when the members meet with obstructions, and operative connections for the mechanism.

2. In ditching apparatus, in combination, a frame, earth removing mechanism hingedly connected with the frame, said mechanism including a frame, a bail pivotally connected therewith, an arm pivotally supported on the first frame and pivotally connected with the bail, a counterweight on the arm, and means on the first frame for engaging the free end of the arm and holding it adjustably in position, and means to operate said earth removing mechanism.

3. In ditching apparatus, in combination, a frame, an engine thereon, means for self-propulsion connected with the engine and the frame, earth removing mechanism hingedly connected at one end thereof with the frame, counterbalancing means connected with the other end thereof and adapted to raise or lower it in a vertical plane, appliances coacting with the last means to hold the earth removing mechanism yieldingly in adjusted position, and operative connections between the engine and the earth removing mechanism.

4. In ditching apparatus, in combination, a frame, adjustable earth removing mechanism hingedly connected with the frame, including a frame, a guideway on the bottom thereof, pivotally mounted scrapers adapted to travel on the last frame, adjustable means on the back of the scrapers adapted to coact with the guide-way to actuate the scrapers to remove and discharge earth, and means to operate said earth removing mechanism.

5. In ditching apparatus, in combination, a frame, adjustable earth removing mechanism hingedly connected with the frame, including a frame, a guideway on the bottom of the last frame, a weed cutter and a pivotally mounted rake both adapted to travel on the last frame, an arm coacting with the guideway to actuate the rake to remove and discharge cut weeds, and means to operate said earth removing mechanism.

6. In ditching apparatus, in combination, a frame, a frame hingedly connected therewith, endless carriers adapted to travel on the last frame, scrapers on the carriers, means to operate the carriers, a guideway on the bottom of the last frame, arms connected with said scrapers and adapted to contact with the guideway to actuate the scrapers to remove earth, said arms and scrapers constructed and arranged to permit the scrapers to drop back and turn face downward to discharge the earth when the arms clear the inner end of the guideway.

7. In ditching apparatus, in combination, a frame, a second frame hingedly connected therewith, endless carriers arranged to travel on the second frame, means to operate the carriers, a guideway on the bottom of the second frame, toothed scrapers on the carriers, adjustable arms connected to the back of the scrapers and adapted to contact with the guideway to actuate the scrapers to remove earth, said scrapers arranged and adapted to permit the lower edge thereof to drop back when the arms clear the inner end of the guideway to discharge the earth, substantially as described.

8. In ditching apparatus, in combination, a frame, a second frame hingedly connected therewith, endless carriers arranged to travel on the second frame, means to operate the carriers, a guideway on the second frame, scrapers on the carriers, rearwardly extending arms connected with said scrapers and adapted to contact with said guideway to hold the scrapers substantially vertically to remove earth, said arms and said scrapers constructed and arranged to permit the scrapers to drop back and turn face downward to discharge the earth when said arms clear the inner end of the guideway.

In testimony whereof, I have signed my name to this specification in the presence of two subscribing witnesses at Los Angeles, county of Los Angeles, State of California, this 16th day of May A. D. 1910.

JOSEPH E. WYCKOFF.

Witnesses:
ALEX CURRIE,
A. H. LIDDERS.